United States Patent [19]

Wilson et al.

[11] Patent Number: 5,208,914
[45] Date of Patent: May 4, 1993

[54] METHOD AND APPARATUS FOR NON-SEQUENTIAL RESOURCE ACCESS

[75] Inventors: Jimmie R. Wilson, Eau Claire; Douglas R. Beard, Eleva; Steve S. Chen, Chippewa Falls; Roger E. Eckert, Eau Claire; Richard E. Hessel, Altonna; Andrew E. Phelps, Eau Claire; Alexander A. Silbey, Eau Claire; Brian D. Vanderwarn, Eau Claire, all of Wis.

[73] Assignee: Superconductor Systems Limited Partnership, Eau Claire, Wis.

[21] Appl. No.: 535,786

[22] Filed: Jun. 11, 1990

Related U.S. Application Data

[63] Continuation-in-part of Ser. No. 459,083, Dec. 29, 1989.

[51] Int. Cl.$^5$ ............................ G06F 9/00; G06F 9/46
[52] U.S. Cl. .................................. 395/275; 364/228.9; 364/231.8; 364/239.4; 364/239.7; 364/241.2; 364/241.4; 364/242.8; 364/243.5; 364/243.1; 364/260.1; 364/931.42; 364/935.41; 364/939.3; 364/964.27; 364/964.7; 364/965.4; 364/967.4; 364/DIG. 1; 364/DIG. 2
[58] Field of Search ................ 364/200, 500; 395/275

[56] References Cited

U.S. PATENT DOCUMENTS

| | | | |
|---|---|---|---|
| 4,318,173 | 5/1982 | Freedman et al. | 395/650 |
| 4,320,451 | 3/1982 | Bachman et al. | 395/650 |
| 4,325,120 | 4/1982 | Colley et al. | 305/375 |
| 4,466,063 | 8/1984 | Segarra et al. | 395/200 |
| 4,530,057 | 7/1985 | Johnson et al. | 364/200 |
| 4,644,461 | 2/1987 | Jennings . | |
| 4,663,706 | 5/1987 | Allen et al. . | |
| 4,682,284 | 7/1987 | Schroder | 395/425 |
| 4,805,107 | 2/1989 | Kieckhafer et al. . | |
| 4,807,111 | 2/1989 | Cohen et al. | 395/250 |
| 4,967,342 | 10/1990 | Lent et al. | 364/200 |
| 4,972,314 | 11/1990 | Getzinger et al. | 364/200 |
| 5,012,409 | 4/1991 | Fletcher et al. | 364/200 |

Primary Examiner—Dale M. Shaw
Assistant Examiner—Robert S. Hauser
Attorney, Agent, or Firm—Patterson & Keough

[57] ABSTRACT

A method and apparatus for non-sequential access to shared resources in a multiple requestor system uses a variety of tags to effectively re-order the data at its destination. In simplest form, the tag directs switching logic to where in a buffer to locate another tag for direction information or where in a buffer or processor (register) to put the response associated with the tag. For example, loading data from memory requires that the requestor provide a request signal, an address, and a request tag. The request signal validates the address and request tag. The address specifies the location of the requested data in memory. The request tag specifies where to put the data when it is returned to the processor. The switching logic for the requestor includes a tag queue for storing the request tags associated with the resource requests, logic means for associating the respective request tag from the tag queue with a resource response, and means for returning the resource response and respective request tag to the requestor. The switching logic associated with the shared resource includes switching means to route the request into and out of the shared resource, control logic to correctly route the request, logic to handle multiple decision requests, and logic to store or retrieve the ultimate data entity being requested.

19 Claims, 17 Drawing Sheets

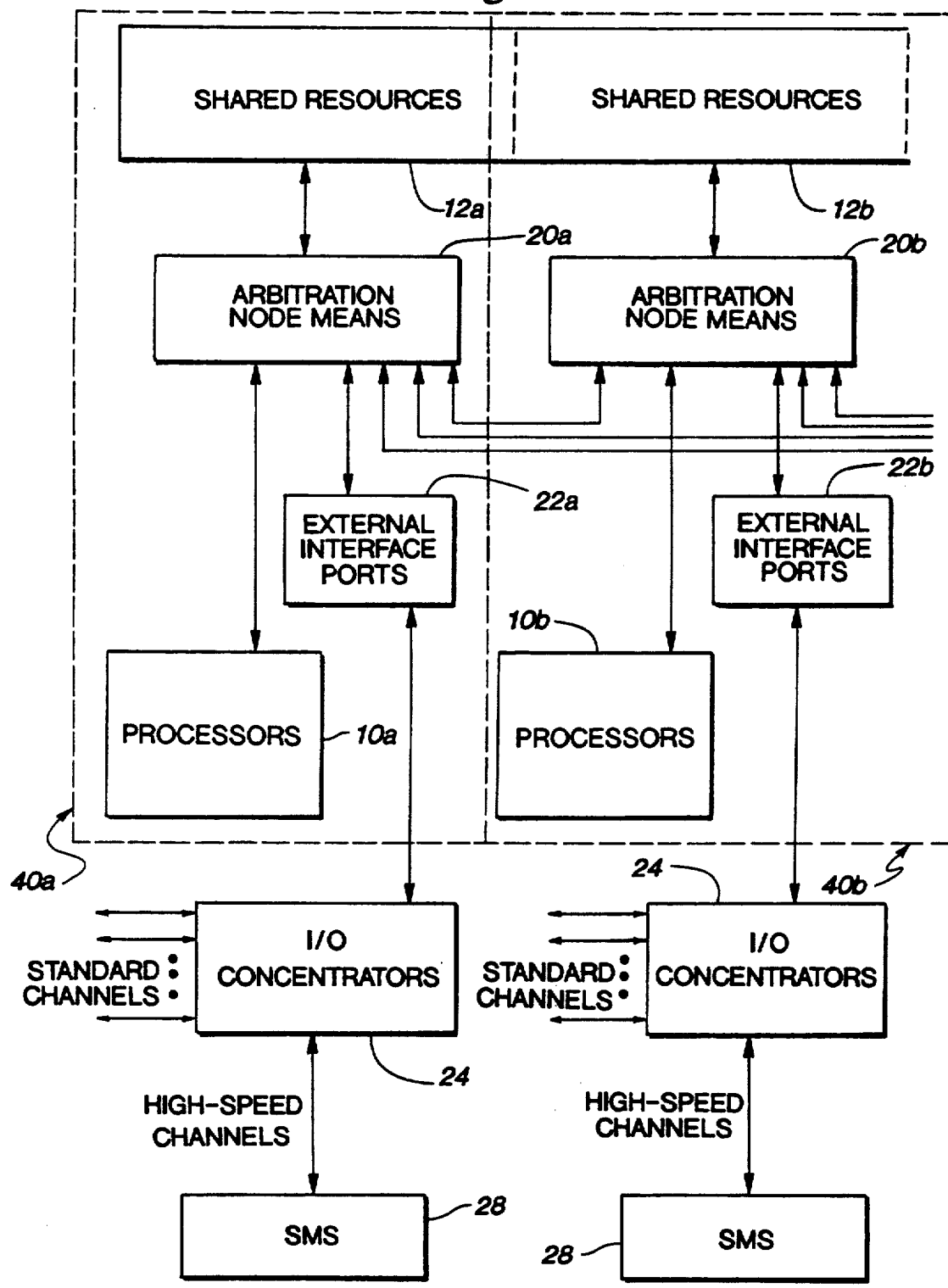

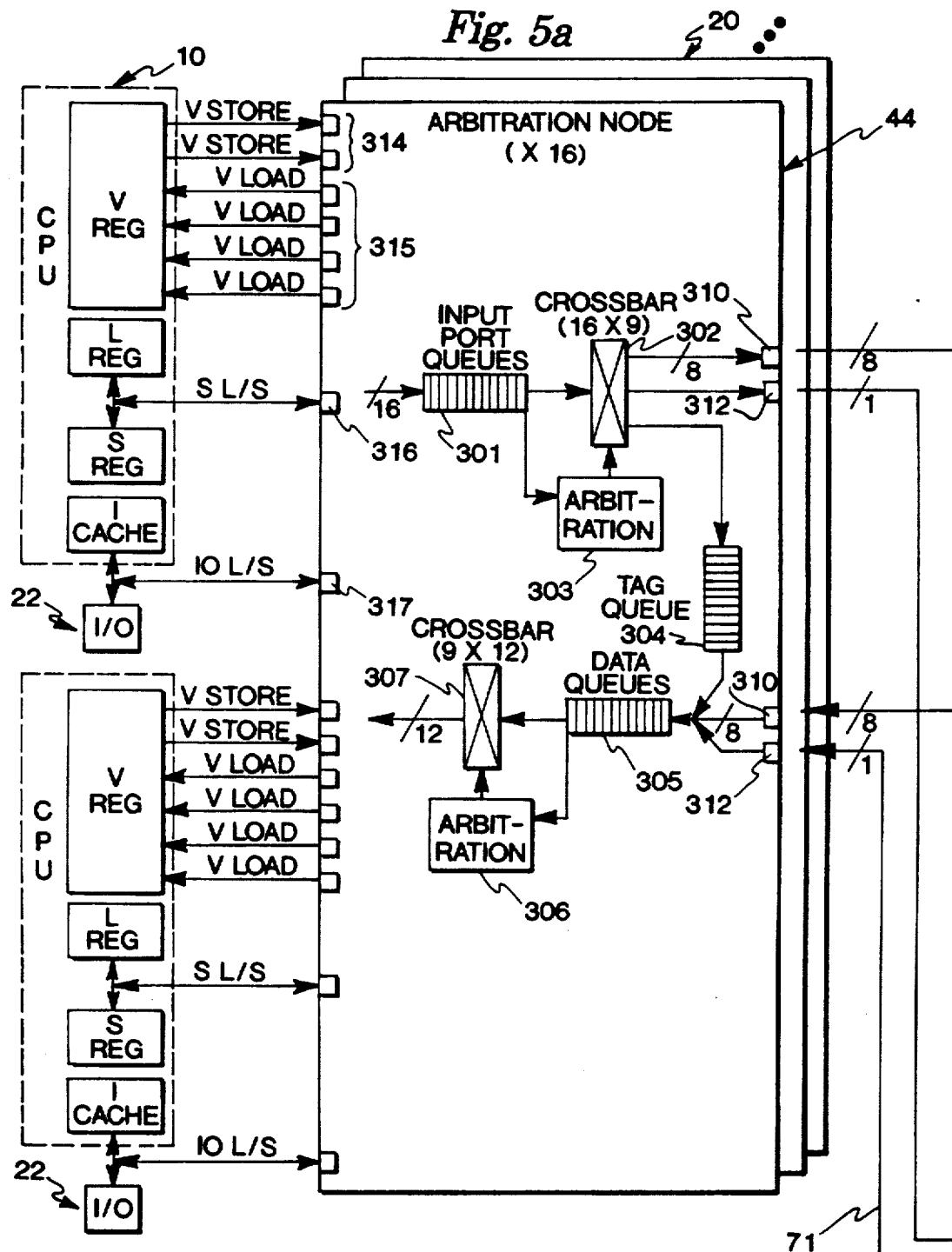

Fig. 7a

VECTOR PORT TAGS

THE 8-BIT TAG IS PARTITIONED AS FOLLOWS:

| 7 | 6 | 5 | 4 | 3 | 2 | 1 | 0 |
|---|---|---|---|---|---|---|---|
| CAN | L/R | EL5 | EL4 | EL3 | EL2 | EL1 | EL0 |

WHERE THE CAN BIT INDICATES THAT A NaN SHOULD BE SUBSTITUTED FOR THE RETURN DATA. THE L/R BIT INDICATES WHICH OF THE TWO QUEUES (1 PER POSSIBLE OUTSTANDING LOAD) TO USE FOR REORDERING. THE 6 LSBS OF THE TAG DIRECT WHICH VECTOR REGISTER ELEMENT NUMBER TO UPDATE WITH THE INCOMING DATA.

Fig. 7b

SCALAR PORT TAGS

THE 11-BIT TAG IS PARTITIONED AS FOLLOWS:

| 10 | 9 | 8 | 7 | 6 | 5 | 4 | 3 | 2 | 1 | 0 |
|---|---|---|---|---|---|---|---|---|---|---|
| CAN | L/S | REG8 | REG7 | REG6 | REG5 | REG4 | REG3 | REG2 | REG1 | REG0 |

WHERE THE CAN BIT INDICATES THAT A NaN SHOULD BE SUBSTITUTED FOR THE RETURN DATA. THE L/S BIT INDICATES WHETHER TO WRITE AN L OR S REGISTER WHOSE NUMBER IS INDICATED BY BITS EIGHT THROUGH ZERO.

Fig. 7c

INSTRUCTION / IO PORT TAGS

THE 10-BIT TAG IS PARTITIONED AS FOLLOWS FOR INSTRUCTION FETCHES:

| 9 | 8 | 7 | 6 | 5 | 4 | 3 | 2 | 1 | 0 |
|---|---|---|---|---|---|---|---|---|---|
| 0 | 0 | 0 | 0 | BNUM | E4 | E3 | E2 | E1 | E0 |

WHERE BNUM INDICATES ONE OF TWO BUFFER NUMBERS, AND E4 THROUGH E0 INDICATE THE ENTRY NUMBER IN THE BUFFER.

Fig. 7d

AND AS FOLLOWS FOR I/O FETCHES:

| 9 | 8 | 7 | 6 | 5 | 4 | 3 | 2 | 1 | 0 |
|---|---|---|---|---|---|---|---|---|---|
| T9 | T8 | T7 | T6 | T5 | T4 | T3 | T2 | T1 | T0 |

WHERE T9 THROUGH T0 ARE STORED IN THE I/O FIFO ALONG WITH THE RETURN DATA.

Fig. 7e

THE 21-BIT CLUSTER TAG IS PARTITIONED AS FOLLOWS:

| 20 | 19 | 18 | 17 | 16 | 15 | 14 | 13 | 12 | 11 | 10 | 9 | 8 | 7 | 6 | 5 | 4 | 3 | 2 | 1 | 0 |
|----|----|----|----|----|----|----|----|----|----|----|----|----|----|----|----|----|----|----|----|----|
| A3 | A2 | A1 | A0 | AP | SC | P3 | P2 | P1 | P0 | C9 | C8 | C7 | C6 | C5 | C4 | C3 | C2 | C1 | C0 | CP |

WHERE:

- A3:A0    ARBITRATION NODE IDENTIFICATION NUMBER
- AP    PARITY OVER ARBITRATION NODE IDENTIFICATION NUMBER FIELD
- SC    STORE CLASS BIT
- P3:P0    PORT IDENTIFICATION NUMBER
- C9:C    ORIGINAL ARBITRATION NODE PORT TAG
- CP    PARITY OVER STORE CLASS BIT FIELD, PORT IDENTIFICATION NUMBER FIELD, AND ORIGINAL ARBITRATION NODE PORT TAG FIELD

Fig. 9

| COMMAND BLOCK WORD | TAG (BINARY) | FUNCTION |
|---|---|---|
| 1 | 1X11000000 | TRANSFER STATUS |
| 2 | 1X11000001 | SMTC COMMAND |
| 3 | 1X11000010 | SM FIRST BLOCK ADDRESS |
| 4 | 1X11000011 | BLOCK COUNT |
| 5 | 1X11000100 | SM BLOCK ADDRESS INCREMENT |
| 6 | 1X11000101 | MAIN MEMORY FIRST WORD ADDRESS |
| 7 | 1X11000110 | SIGNAL DEVICE SELECT |

WHERE X = 0 FOR SMTC0 AND X = 1 FOR SMTC1 IN THE TAG FIELD.

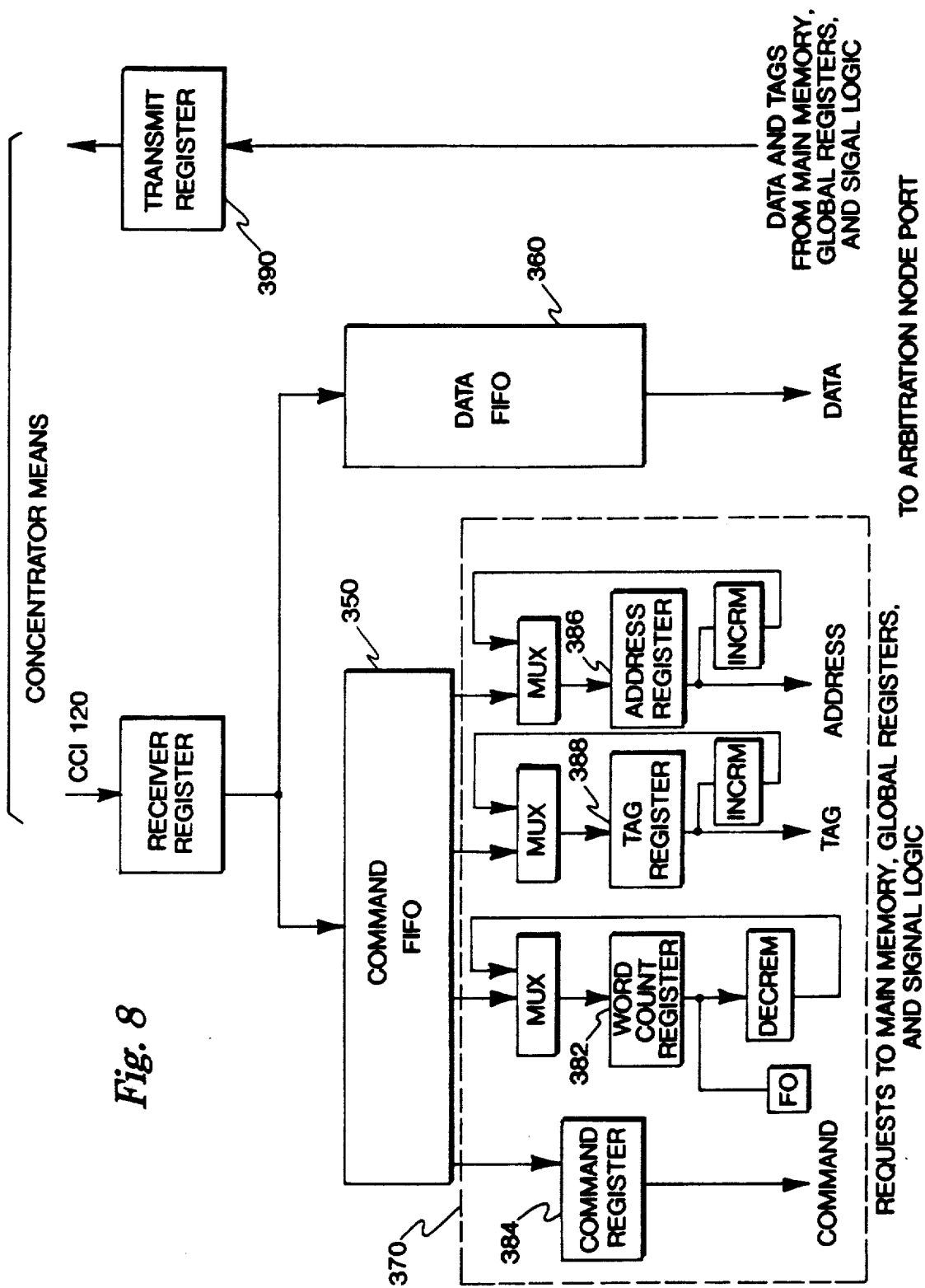

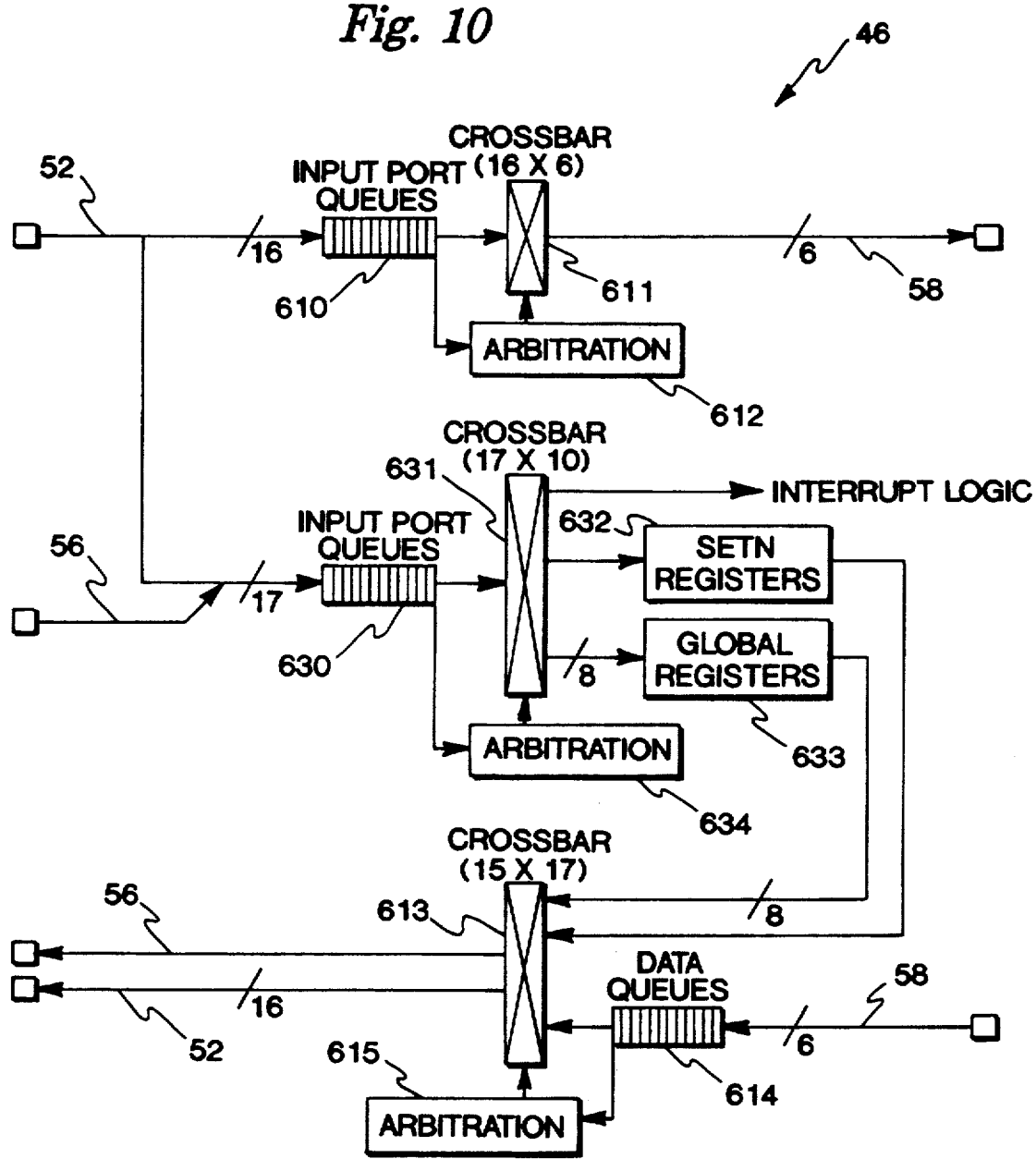

METHOD AND APPARATUS FOR NON-SEQUENTIAL RESOURCE ACCESS

RELATED APPLICATION

This application is a continuation-in-part of an application filed in the United States Patent and Trademark on Dec. 29, 1989, entitled CLUSTER ARCHITECTURE FOR A HIGHLY PARALLEL SCALAR/VECTOR MULTIPROCESSOR SYSTEM, Ser. No. 07/459,083, and assigned to the assignee of the present invention, a copy of which is attached and hereby incorporated in the present application. This application is also related to a co-pending application filed in the United States Patent and Trademark Office concurrently herewith, entitled, DISTRIBUTED INPUT-/OUTPUT ARCHITECTURE FOR A MULTIPROCESSOR SYSTEM, Ser. No. 07/536,182, now U.S. Pat. No. 5,168,547, issued Dec. 1, 1992, which is assigned to the assignee of the present invention, and a copy of which is attached and hereby incorporated in the present application.

TECHNICAL FIELD

This invention relates generally to the field of memory systems and memory management for computer and electronic logic systems. More particularly, the present invention relates to a method and apparatus for non-sequential memory access capable of issuing requests to shared resources, particularly main memory, for which the responses may be returned out-of-order relative to the sequence in which the requests were issued.

BACKGROUND ART

Traditional methods and apparatus in multiple requestor systems for accessing shared hardware resources, and in particular main memory, have required that requests to the shared resource maintain a time-ordered or sequences relationship with one another to prevent overwriting or incorrect access to data or instructions by the system. In fact, the possibility of an out-of-order access to a shared resource is normally thought of as an incorrect access to data and/or instructions and is referred to in the prior art as a memory access hazard.

In the prior art, one technique used to control access to shared resources in a multiprocessor system is to maintain a centralized control mechanism that handles requests to the shared resources with a global decision algorithm. When the multiprocessor system has few requestors and few shared resources in a physically small system, this approach is viable. In larger multiprocessor systems with many requestors and many shared resources, the centralized approach using a global decision algorithm becomes unwieldy and the decision time begins to impact the overall processing performance of the multiprocessor system.

Another prior art technique is to interlock the various decisions with time tags so that a given decision will be made only when previous decisions have cleared. The problem with this approach is that the transient time for signals to travel around the system updating these time tags becomes prohibitive and, again, the overall system performance is adversely affected.

In essence, the problem of resource lockout and shared resource access has been managed in prior art supercomputers by employing centralized control mechanisms that schedule each resource sequentially throughout the multiprocessor system. This approach effectively avoids the problem of memory access hazards at the expense of system performance.

In designing new methods and systems for accessing shared resources in a multiprocessor system, there are four important issues to be considered. The first issue is how to maximize the throughput of the shared resources. The second issue is how to maximize the bandwidth between the processors and the shared resources. The third issue is how to minimize the access time between the processors and shared resources. The last issue is how to avoid hazards so that predictable results are obtained for resource requests. When a computer processing system does not have optimized solutions to all of these issues, the performance of the system is effectively limited.

For example, consider the problem of a processor making three requests to main memory, each request destined for a different section of main memory that, as a result, will be processed by three separate logic mechanisms. In the prior art, each of the requests is required to be consecutive and subsequent requests can not begin until the previous request is completed. In the three request example, the requirement for sequential access effectively results in two-thirds of the logic associated with the main memory being idle. This limitation is particularly damaging in high performance systems where the objective is to keep the processing elements and shared resources continually busy by providing them with a steady stream of work to be done in the form of pipelined operations.

In an effort to increase the processing speed and flexibility of such high performance computer processing systems, often referred to as supercomputers, the previously identified parent application to this invention provides an architecture for supercomputers wherein a multiple number of processors and external interfaces can make multiple and simultaneous requests to a common set of shared hardware resources, such as main memory, global registers or interrupt mechanisms. The prior art techniques that utilize centralized control mechanisms to schedule each resource sequentially throughout the multiprocessor system are unacceptable for this type of cluster architecture for highly parallel multiprocessors. Consequently, a new method and apparatus for memory access is needed to increase performance in a multiprocessor system by insuring equal and democratic access for all requestors across all shared resources and allowing each shared resource to process data at independent rates, and at the same time avoiding access hazards.

SUMMARY OF THE INVENTION

The present invention is a method and apparatus for non-sequential access to shared resources in a multiple requestor system. To accomplish this, the present invention uses a variety of tags to effectively re-order the data at its destination. In simplest form, the tag directs switching logic to where in a buffer to locate another tag for direction information or where in a buffer or processor (register) to put the response associated with the tag. For example, loading data from memory requires that the requestor provide a request signal, an address, and a request tag. The request signal validates the address and request tag. The address specifies the location of the requested data in memory. The request tag specifies where to put the data when it is returned to the processor.

The apparatus for non-sequential shared resource access in accordance with the present invention is used in a multiprocessor system having a plurality of processors and a plurality of input/output interfaces that may also access the shared resources of the multiprocessor system. The shared resources in the preferred embodiment include main memory, global registers and interrupt mechanisms. For non-sequential access within a cluster of tightly-coupled processors, the present invention comprises a request generation means for generating a plurality of resource requests from the processors, switching means operably connected to the request generation means for receiving the resource requests in a time order in which the resource requests were generated and routing the resource requests to the shared resources, and shared resource means servicing the resource requests as the requested resources become available. Each of the resource requests includes an address for a requested shared resource, and a request tag designating a location within the requestor where the resource request is to be returned.

The switching logic associated with the switching means includes a tag queue for storing the request tags associated with the resource requests, logic means for associating the respective request tag from the tag queue with a resource response, and means for returning the resource response and respective request tag to the processor. The switching logic associated with the shared resource includes switching means to route the request into and out of the shared resource, control logic to correctly route the requests, logic to handle multiple decision requests, and logic to store or retrieve the ultimate data entity being requested.

In an alternative embodiment, the present invention also permits non-sequential access to shared resources external to a tightly-coupled cluster of processors. In this embodiment, a remote cluster adapter is provided with logic means to attach additional routing information to the request tag to create a new tag which is called the cluster tag. The cluster tag is passed to the target cluster's remote cluster adapter where the cluster tag is stripped from the request and stored in a tag buffer. A new request tag is generated for use internal to the target cluster. When the response is returned to the target cluster's remote cluster adapter the returned request tag is used to locate the corresponding cluster tag associated with it in the tag buffer. The response and the cluster tag are then returned to the requesting cluster. At the requesting cluster's remote adapter the cluster tag is broken apart into its parts, additional return routing information and request tag. The additional return routing part to used to steer the response and the requesting tag part back to the requesting switch means.

It is a particular consequence of this system that control is handled locally and decisions concerning access to shared resources are made quickly and only at the time necessary to insure full utilization of the resource. By maintaining the highest possible system throughput coupled with a very high system bandwidth, the present invention insures that requestors are constantly supplied with data for processing in a minimal access time, thereby increasing the overall performance of a multiprocessor system for a given set of system bandwidth and throughput parameters.

An objective of the present invention is to provide a method and apparatus for non-sequential memory access capable of issuing requests to shared resources for which the responses may be returned out-of-order as compared with the time order in which the requests were issued.

Another objective of the present invention is to provide a method and apparatus for memory access that can increase performance in an interleaved shared resource system by insuring that each component of the shared resource system may operate concurrently in parallel and therefore potentially at different rates.

A further objective of the present invention is to provide a method and apparatus for memory access system for a multiprocessor system that delivers high bandwidth, high throughput, and low latency when the multiprocessor system is configured with many requestors and many shared resources.

These and other objectives of the present invention will become apparent with reference to the drawings, the detailed description of the preferred embodiment and the appended claims.

DESCRIPTION OF THE DRAWINGS

FIGS. 3a and 3b are a block diagram of a four cluster implementation of the preferred embodiment of the present invention.

FIGS. 7a, 7b, 7c, 7d and 7e are representations of the various request tags of the present invention.

FIG. 8 is a block diagram of the external interface ports.

FIG. 9 shows the correspondence between the request tag and the command block word.

FIG. 10 is a detailed block diagram of the NRCA means in the preferred embodiment of the present invention.

DESCRIPTION OF THE PREFERRED EMBODIMENT

Figure 1A:
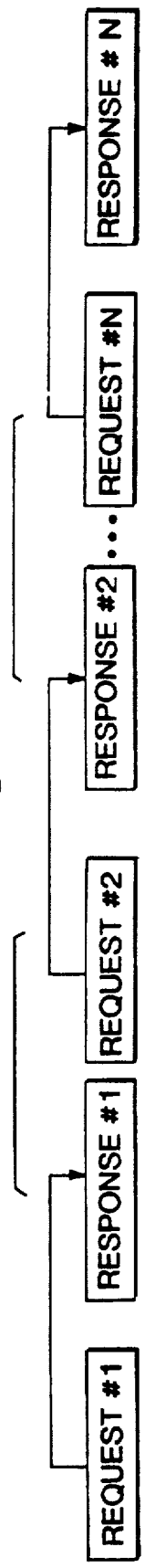
FIGS. 1a, 1b, 1c and 1d are representations of the pipelining request/response memory access techniques of the prior art and the present invention.
Figure 1B:
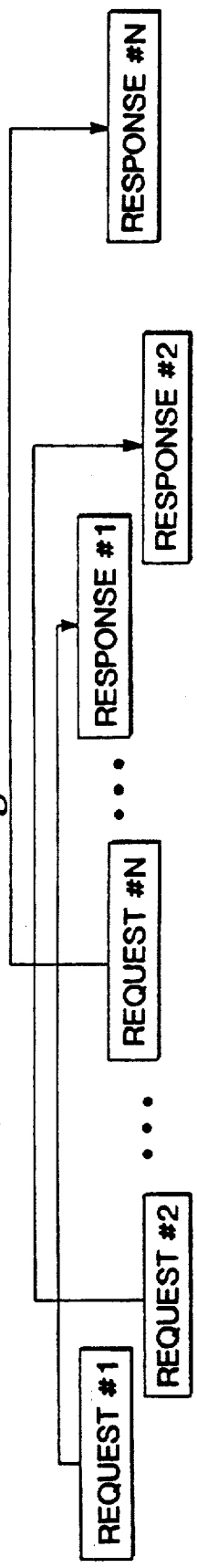

Referring now to FIGS. 1a-1d, a representation of the pipelined, out-of-order access mechanism of the present invention as compared to the prior art is set forth. These figures are applicable to a request/response operation at each level of a memory/shared resource architecture. It will be understood that the shared resource generally accessed in a multiple requestor system is memory and the preferred embodiment of the present invention may be described in terms of accesses to memory; however, the present invention contemplates that the accesses are made to any type of shared hardware resource. Shared hardware resources in this sense will include memory, global registers, interrupt mechanism, as well as ports, paths, functional units, registers, queues, banks, etc. FIG. 1a shows how a stream of requests and responses would be handled in a prior art system. Because there is no capability of out-of-order access or streaming, each consecutive request must wait for its associated response to be completed before the next request can be initiated. Referring now to FIG. 1b, some prior art vector processors support the ability to make consecutive requests to load or write a vector register without the need to wait for each response to return. The limited pipeline technique shown in FIG. 1b has been applied to vector processors accessing main memory, but has not been applied to other system resources.

Figure 1C:
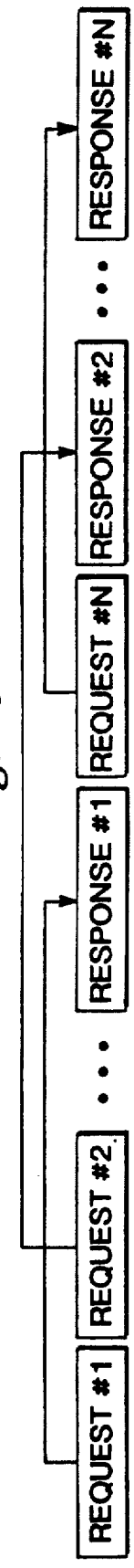
Figure 1D:
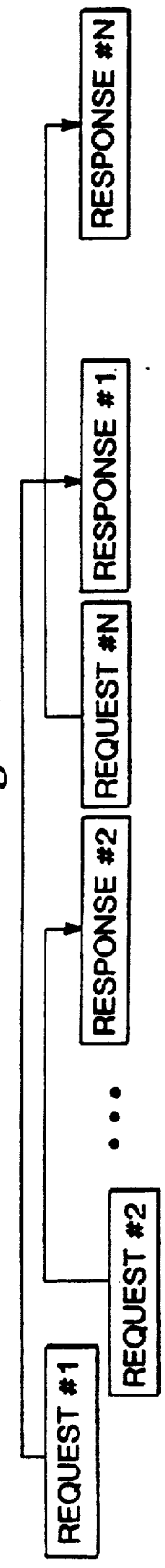

In contrast, FIG. 1c shows an interleaved series of requests and responses in which all of the requests and their associated responses are time ordered, however, response 1 may be returned before request n is issued. In FIG. 1d the full capabilities of out-of-order access mechanism of the present invention are illustrated with requests and their associated responses occurring with no particular respect to time ordering. In the memory access system shown here, response 2 is allowed to be returned prior to response 1. The pipeline techniques shown in FIG. 1d have not been applied in the prior art.

In describing the preferred embodiment, the presentation will begin with a description of the preferred embodiment of the multiprocessor system and then describe the method and apparatus for non-sequential access starting with a description of the various requestors and their associated ports and proceeding out into the shared resources of the multiprocessor system.

MULTIPROCESSOR SYSTEM

Figure 2:
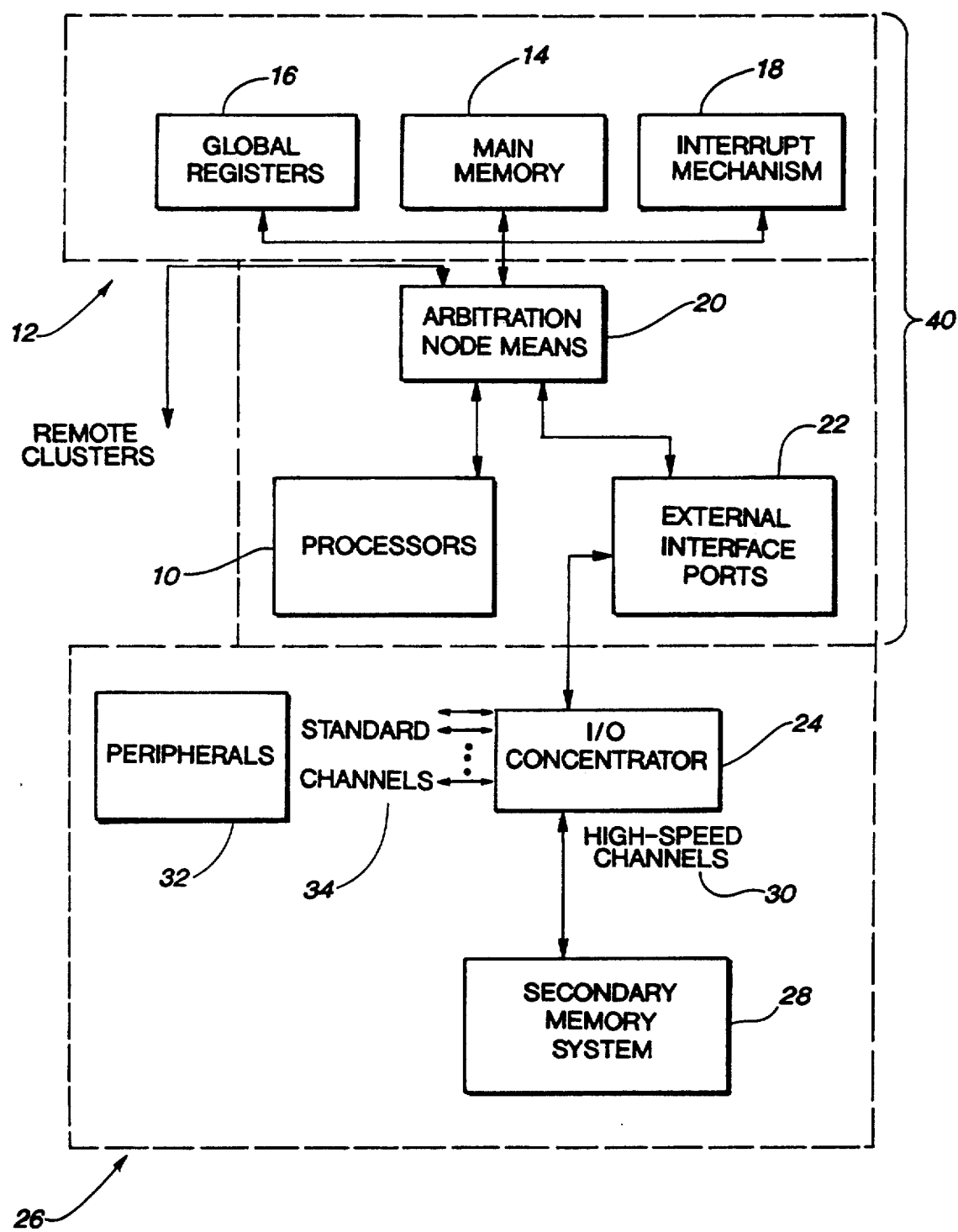
FIG. 2 is a block diagram of a single multiprocessor cluster of the preferred embodiment of the present invention.

Referring now to FIG. 2, the architecture of a single multiprocessor cluster of the preferred embodiment of the multiprocessor system for use with the present invention will be described. The preferred cluster architecture for a highly parallel scalar/vector multiprocessor system is capable of supporting a plurality of high-speed processors 10 sharing a large set of shared resources 12 (e.g., main memory 14, global registers 16, and interrupt mechanisms 18). The processors 10 are capable of both vector and scalar parallel processing and are connected to the shared resources 12 through an arbitration node means 20. Also connected through the arbitration node means 20 are a plurality of external interface ports 22 and input/output concentrators (IOC) 24 which are further connected to a variety of external data sources 26. The external data sources 26 may include a secondary memory system (SMS) 28 linked to the input/output concentrator 24 via a high speed channel 30. The external data sources 26 may also include a variety of other peripheral devices and interfaces 32 linked to the input/output concentrator 24 via one or more standard channels 34. The peripheral devices and interfaces 32 may include disk storage systems, tape storage system, printers, external processors, and communication networks. Together, the processors 10, shared resources 12, arbitration node 20 and external interface ports 22 comprise a single multiprocessor cluster 40 for a highly parallel multiprocessor system in accordance with the preferred embodiment of the present invention.

Figure 3B:
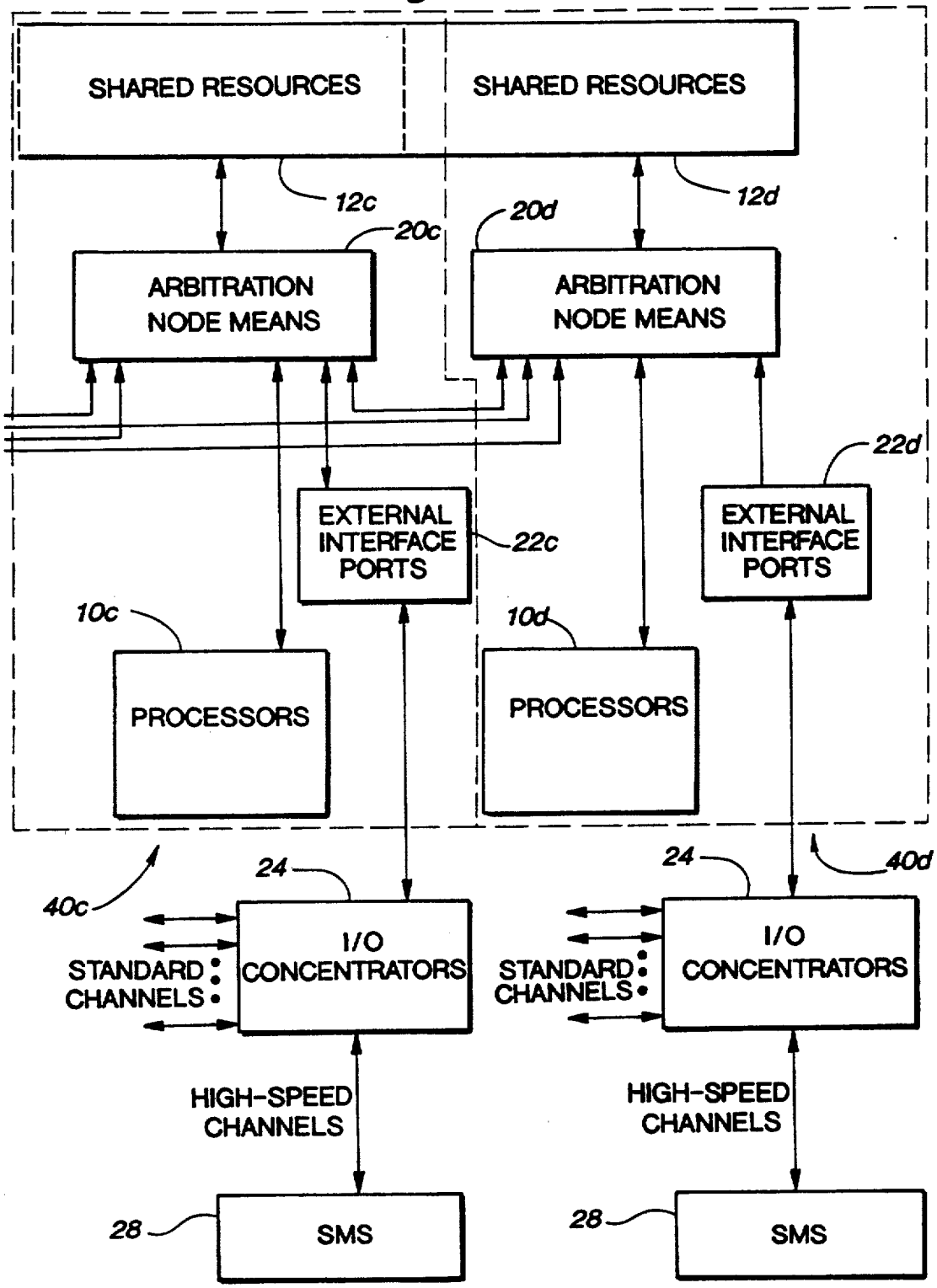

The preferred embodiment of the multiprocessor clusters 40 overcomes the direct-connection interface problems of present shared-memory supercomputers by physically organizing the processors 10, shared resources 12, arbitration node 20 and external interface ports 22 into one or more clusters 40. In the preferred embodiment shown in FIGS. 3a and 3b, there are four clusters: 40a, 40b, 40c and 40d. Each of the clusters 40a, 40b, 40c and 40d physically has its own set of processors 10a, 10b, 10c and 10d, shared resources 12a, 12b, 12c and 12d, and external interface ports 22a, 22b, 22c and 22d that are associated with that cluster. The clusters 40a, 40b, 40c and 40d are interconnected through a remote cluster adapter 42 that is a logical part of each arbitration nodes means 20a, 20b, 20c and 20d. Although the clusters 40a, 40b, 40c and 40d are physically separated, the logical organization of the clusters and the physical interconnection through the remote cluster adapter 42 enables the desired symmetrical access to all of the shared resources 12a, 12b, 12c and 12d across all of the clusters 40a, 40b, 40c and 40d.

Figure 4:
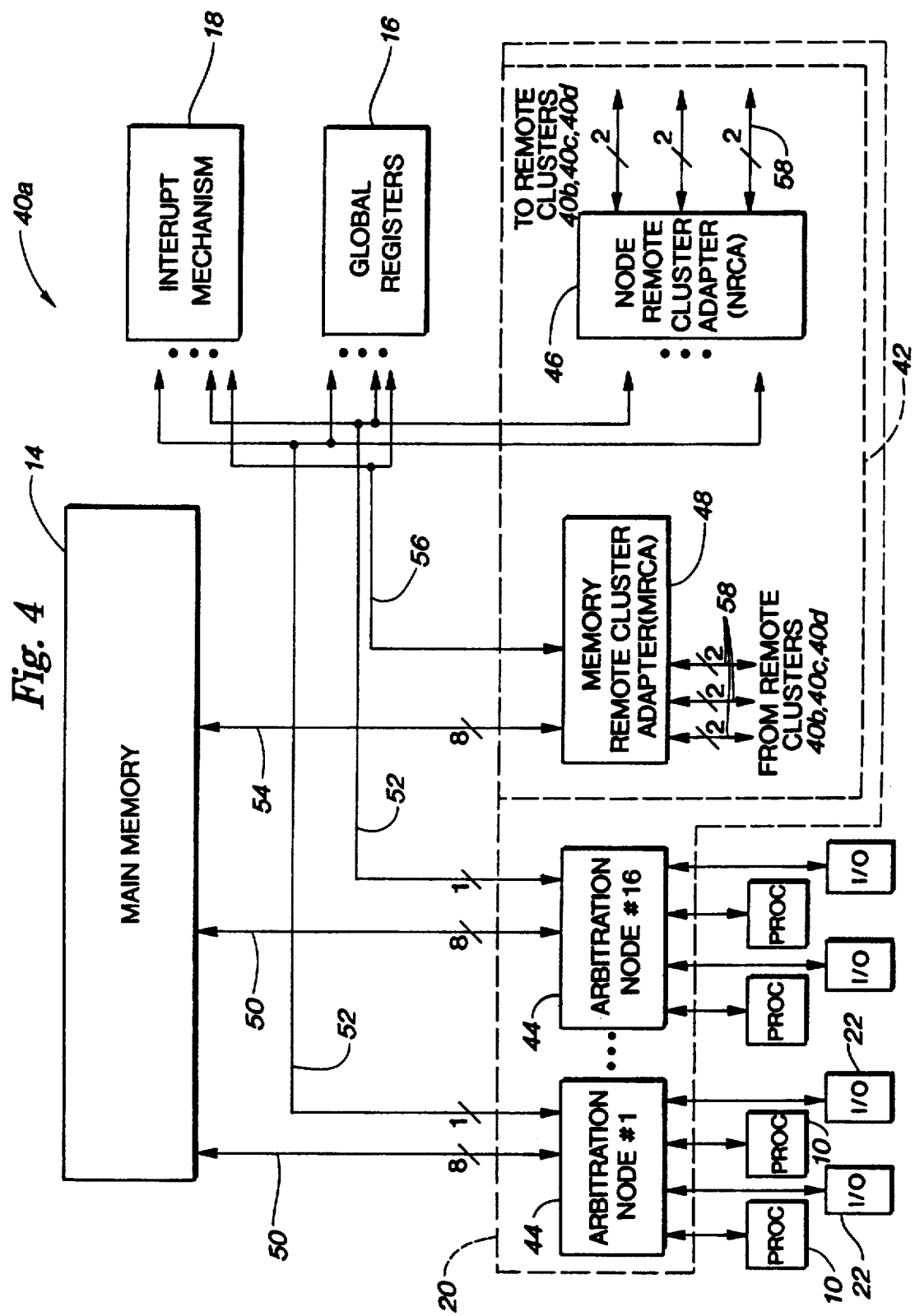
FIG. 4 is a block diagram of a single multiprocessor cluster showing the arbitration node means of the preferred embodiment.

Referring now to FIG. 4, the preferred embodiment of the arbitration node means 20 for a single cluster 40 will be described. At a conceptual level, the arbitration node means 20 comprises a plurality of crossbar switch mechanisms that symmetrically interconnect the processors 10 and external interface ports 22 to the shared resources 12 in the same cluster 40, and to the shared resources 12 in other clusters 40 through the remote cluster adapter means 42. Typically, a full crossbar switch would allow each requestor to connect to each resource. In the present invention, the arbitration node means 20 allows a result similar to a full crossbar switch to be achieved in the situation where there are more requestors than resources. In the preferred embodiment, the arbitration node means 20 is comprised of sixteen arbitration nodes 44 and the remote cluster adapter means 42. The remote cluster adapter means 42 is divided into a node remote cluster adapter (NRCA) means 46 and a memory remote cluster adapter (MRCA) means 48. The NRCA means 46 allows the arbitration node 44 to access the remote cluster adapter means 42 of all other multiprocessor clusters 40. Similarly, the MRCA means 48 controls access to the shared resources 12 of this cluster 40 from the remote cluster adapter means 42 of all other multiprocessor clusters 40.

In this embodiment, the sixteen arbitration nodes 44 interconnect thirty-two processors 10 and thirty-two external interface ports 22 with the main memory 14, global register 16 and interrupt mechanism 18, and the NRCA means 46. Each arbitration node 44 is connected with the main memory 14 by eight bidirectional parallel paths 50. A single parallel bidirectional path 52 connects each arbitration node 44 with the NRCA means 46. In the preferred embodiment, the same path 52 from each arbitration node 44 is also used to connect the arbitration node 44 with the global registers 16 and the interrupt mechanism 18, although it will be recognized that separate paths could be used to accomplish this interconnection.

Like each of the arbitration nodes 44, the MRCA means 48 is connected with the main memory 14 by weight parallel bidirectional paths 54. Similarly, a single parallel bidirectional path 56 connects the MRCA means 48 with the global registers 16 and interrupt mechanism 18. In the preferred embodiment, a total of six parallel bidirectional paths 58 are used to interconnect the clusters 40. For example, cluster 40a has two paths 58 that connect with each cluster 40b, 40c and 40d. In this manner, the MRCA means 48 allows other clusters 40 to have direct access to the shared resources 12 of this cluster 40.

For a more detailed description of the preferred embodiment of the multiprocessor clusters 40, reference is made to the parent application previously identified.

Figure 5:
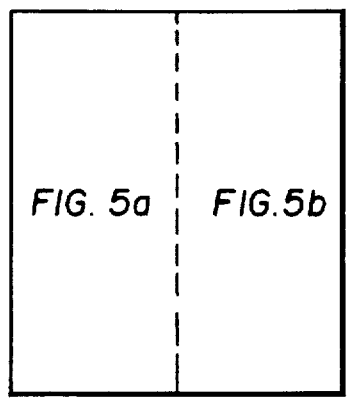
FIG. 5, consisting of 5a and 5b, is a detailed block diagram of the input/output interface in the preferred embodiment of the present invention.
Figure 5B:
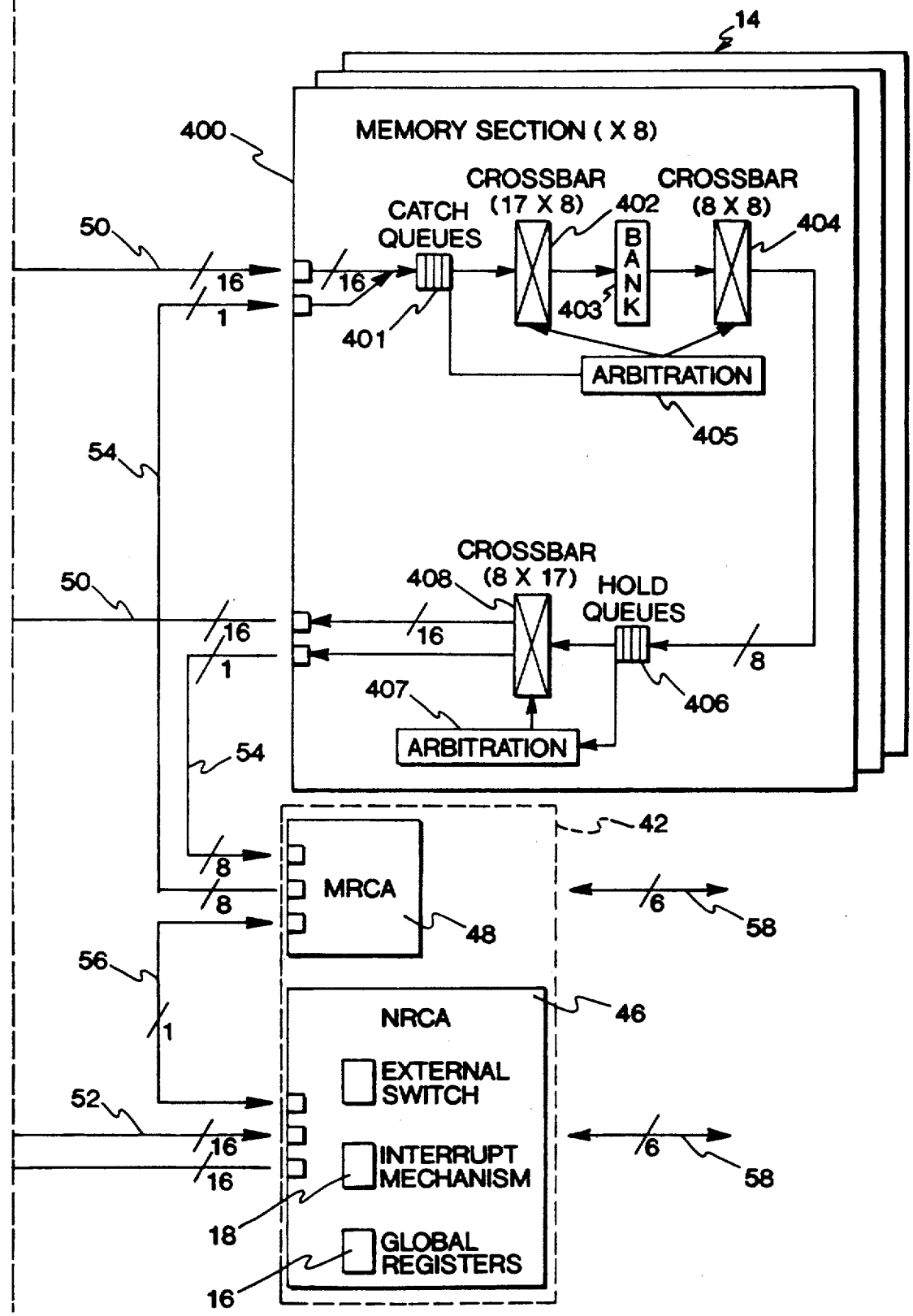

As shown in FIGS. 5a and 5b, arbitration networks 303 and 306 for each of the memory ports 310, the NRCA port 312, and each of the processor ports 314, 315, 316, and 317, comprise the arbitration node 44. Also included in the arbitration node 44 are input port queue 301, crossbars 302 and 307, tag queue 304 and data queue 305. As explained in detail in the parent application, the arbitration networks 303 and 306 use a first-come-first-served, multiple-requestor-toggling system to insure that the oldest reference is processed first. In the case of multiple old references of the same age, a fairness algorithm ensures equal access to the ports 310 and 312 and 315, 316, and 317 that are controlled by that arbitration network 303 or 306, respectively.

In other supercomputers, memory returns come back in the same order the requests were sent out. Thus, there is no ambiguity in where to place the data when it returns, and the memory return logic for the processor is simple. However, restricting memory returns to be in-order also means sacrificing performance because sequencing constraints would cause the shared resources to wait until they were clear of any ordering violations, therefore reducing the amount of concurrent activity. Early returns are those that come back with shorter latency than previously requested returns because of the nonhomogeneous latency of the memory system. If returns are not restricted to coming back in the same order as the requests were issued, the memory subsystem has to provide a sorting mechanism to guarantee this. This represents a considerable burden when there are multiple ports requesting data and multiple memory sections returning the data.

In the present invention, memory data returns may come back in a random order relative to the order of the requests. It is a characteristic of the queuing and arbitration networks throughout the multiprocessor system that whenever requests accumulate in queues, the responses may be returned out of order with respect to the relative time in which they were first entered into the queue. This means that data for early requests may come back later than data for late requests. However, it may not be possible to use the early-arriving data because of sequencing restrictions in the processor. For example, data involved in arithmetic must be used in the same sequence specified in the original program if reproducible results are desired. Therefore, in the present invention, memory return data is placed in its final destination (a vector register, scalar register, L register, instruction cache buffer, or input/output buffer) without regard to whether it can actually be used yet. Whether it can be used is based on the return status of previously issued requests.

The present invention provides a method and apparatus for shared resource access wherein all system resources may be accessed using all of the pipeline techniques as shown in FIGS. 1b-1d. To accomplish this, the present invention uses tags and queues to keep track of requests and responses, to effectively re-order the data at its destination. In simplest form, a tag tells the logic where in the buffer to locate another tag for direction information or where in the buffer or processor (register) to put the response associated with the tag. For example, requesting data from memory requires that the requestor provide a request signal, an address, and a request tag. The request signal validates the address and request tag. The address specifies the location of the response data in main memory. The request tag specifies where to put the data when it is returned to the processor. Although the description of the preferred embodiment is presented in the context of a multiprocessor system with each processor in the system having multiple ports for accessing shared resources, it will be evident that the present invention is equally applicable to a multiprocessor system wherein each processor has only a single port to access memory, or a single processor system having multiple ports to access memory.

PROCESSOR

The following paragraphs describe in greater detail how the processor 10 of the preferred embodiment manages scalar, vector, and instruction requests. There are four vector load ports, one scalar load port, and one instruction load port. Each port has a different mechanism for issuing out-of-order returns.

Figure 6:
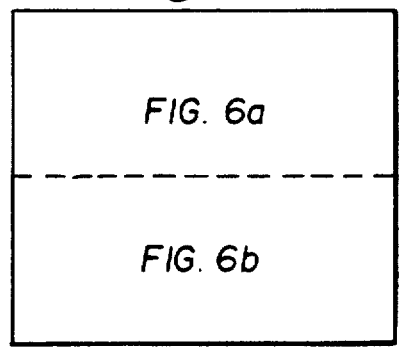
FIG. 6, consisting of 6a and 6b, is a detailed block diagram of the ports associated with the input/output interface in the processor.
Figure 11:
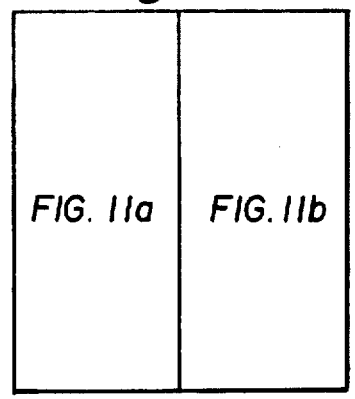
FIG. 11, consisting of 11a and 11b, is a detailed block diagram of the MRCA means in the preferred embodiment of the present invention.
Figure 6A:
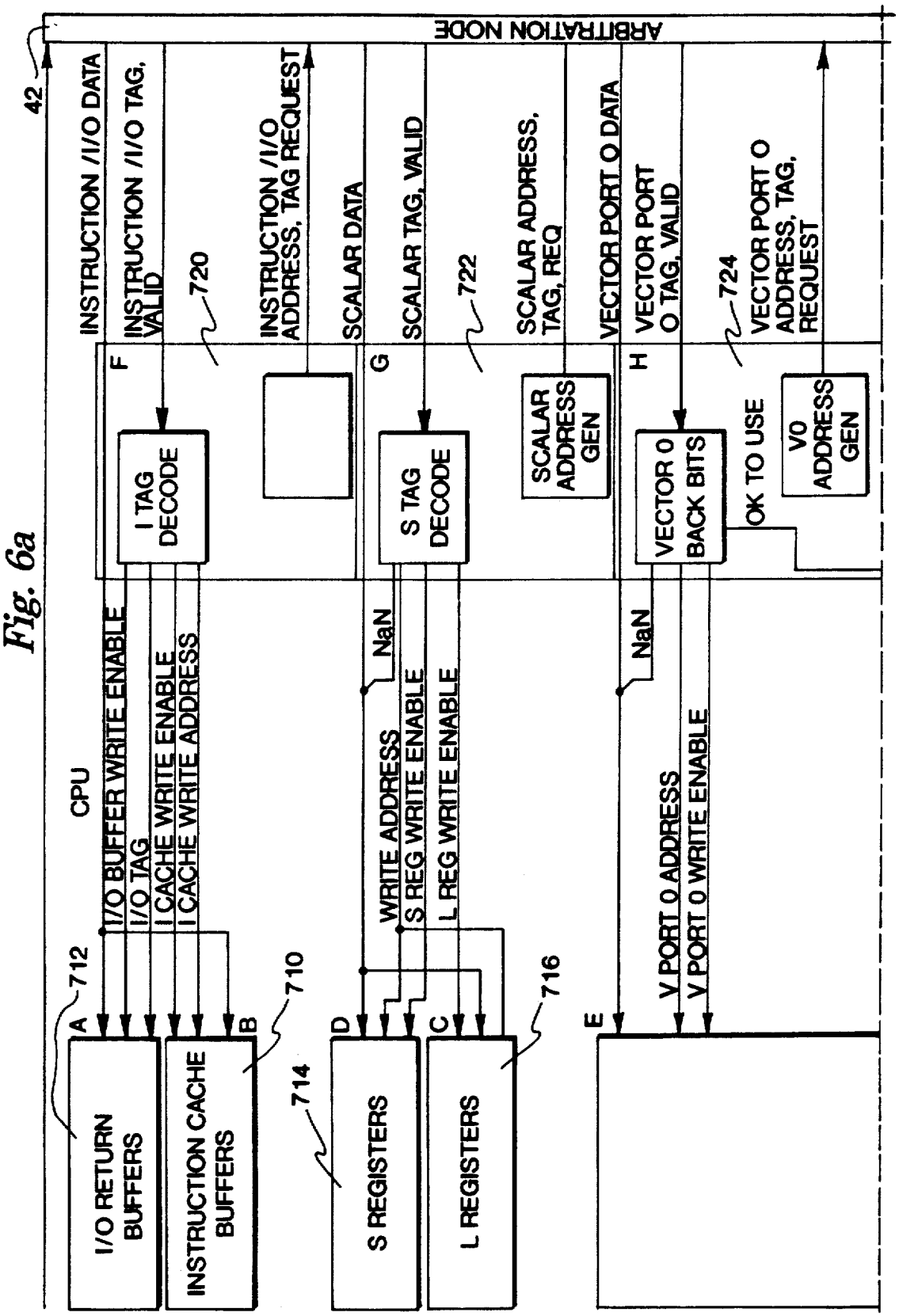
Figure 6B:
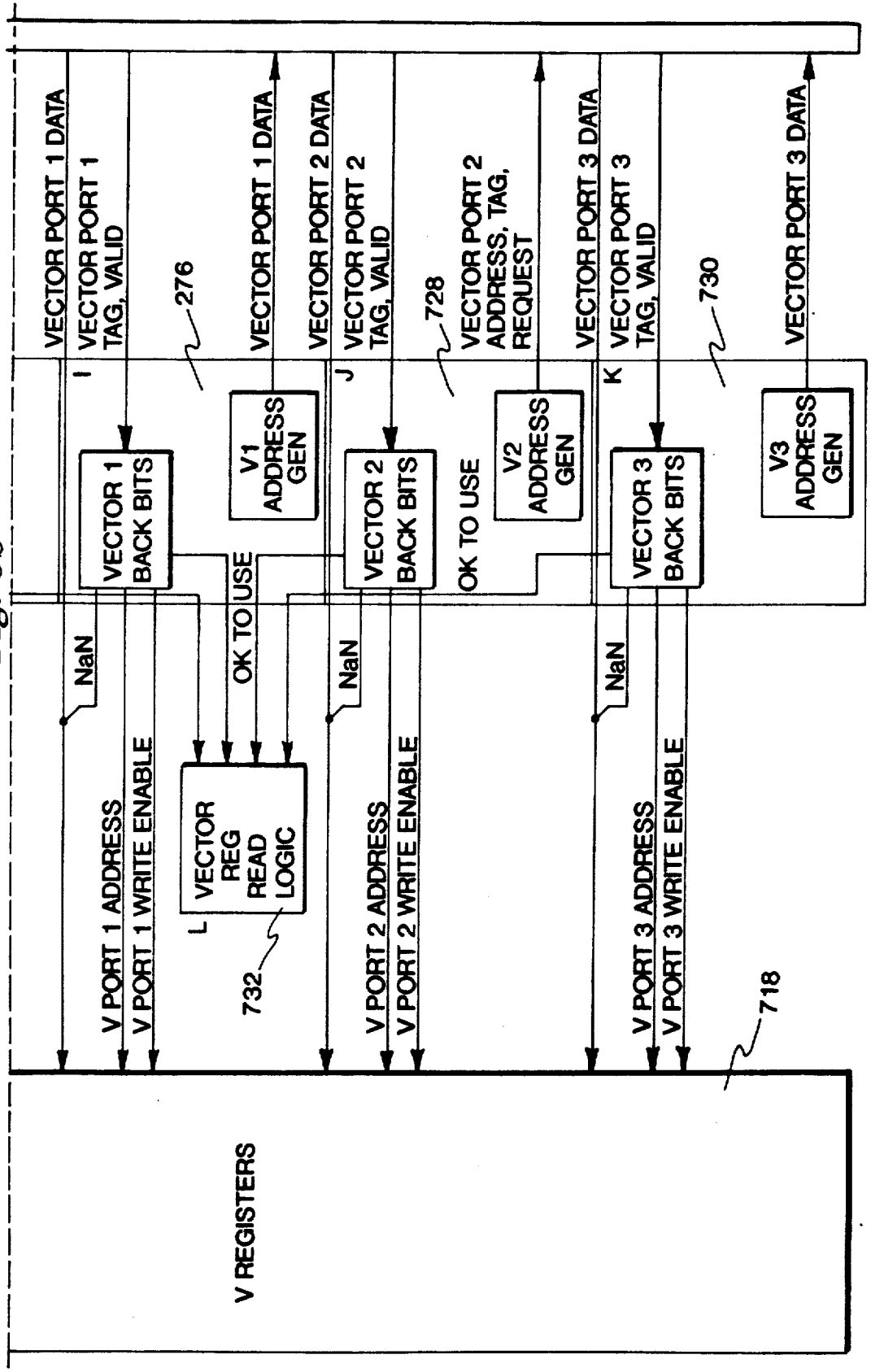

Referring now to FIGS. 6a and 6b, vector load ports 724, 726, 728, and 730 provide a request signal, an address, and a request tag for memory accesses whose data is destined for the vector registers 718. There are four vector load ports, and each load port supports two outstanding vector loads at any given time. Vector load ports make variable-size requests for memory returns for a particular vector register 718. Each request group can consist of between 1 and 64 individual requests. Of the two possible outstanding vector loads for each port, only one can be issuing requests at a time. However, because of the non-sequential nature of the memory returns, it is possible that all of the returns for the second load would arrive before any of the returns for the first load. The vector load port control mechanism 732 must ensure that the data is placed in the proper register, and that the data is not used before all previously issued data for that register is used.

As shown in FIG. 7a, the request tag accompanying each memory request and address from a vector port is large enough to indicate the destination of the memory return, i.e. which of the two possible vector registers to put the data in and which location in that vector register to use. When the request is issued, the vector load port control ensures that the proper tag accompanies the request and address. The first component of the vector tag is the destination register identifier bit. In the preferred embodiment, instead of sending the destination register number as part of the tag, the processor simply sends a single bit indicating one of two registers. The specific register number is established upon instruction issue, and may be different each time the load instruction is issued to the port. Because only a single destination register identifier is included in the tag, only two loads may be outstanding at any given time. Tag collisions (reuse of the same destination register bit) within a port are prevented by waiting for all returns for each register to return before reusing its tag bit. In addition, successive loads from each port always use different destination register tag bits. Another type of tag collision, where multiple loads are outstanding for each vector register (but in different vector load ports), is avoided by waiting for the first vector register load to complete before allowing another load for that register to begin.

The second part of the vector tag is the element number of the vector register. This simply indicates which word of a given register should be updated with the memory data.

The third, and final, part of the vector tag is the "cancel" indicator, which effectively nullifies a load request with respect to the processor 10. To the memory system, however, cancelled requests are treated just like non-cancelled requests, with a minor exception. The exception is that cancelled out-of-cluster requests are redirected in-cluster for performance reasons. The ability to cancel a request after it is issued results in a reduction of effective memory latency because it eliminates some time-critical handshaking between the portion of the processor 10 and arbitration node 44 that handles requests and the portion of the processor 10 and arbitration node 44 that handles addresses. In this embodiment, the cancel bit allows for address validation and request arbitration to overlap and be accomplished in parallel within the processor 10 and the arbitration node 44. In other words, the arbitration node 44 proceeds to a arbitrate for a memory request, for example, at the same time that address control logic within the processor 10 determines whether the address for the memory request is a valid request, i.e. is within the proper address range. If the processor 10 determines that the address is out-of-range, then the cancel bit is set and the request is directed to an in-cluster address.

In one type of operation, the cancel feature is useful for allowing bottom-loading of data in loops. In this software technique, the effect of memory latency is sidestepped by pre-fetching data before you know whether the addresses are valid. In the preferred multiprocessor system, a program may turn off mapping exceptions and access memory at random addresses (even addresses outside its data space) with impunity, and the cancel mechanism makes sure that the program is not allowed to access forbidden data. Thus, the program may access memory before validating the addresses it uses, and the load instructions may be placed at the bottom of the loop ("bottom-loading") rather than the top.

Referring again to FIGS. 6a and 6b the scalar request tag will be described. A single scalar port 722 to memory provides a path for memory data to the S registers 714 and L registers 716. To ensure proper data sequencing, the scalar port, like the vector ports, accompanies each memory request and address with a request tag.

As shown in FIG. 7b, the scalar request tag indicates the destination register type and register number. The first part of the scalar tag is a register type. This distinguishes between L and S register returns. The second part of the scalar tag is a register number. This indicates which register number (L or S) to place the return data. Tag collisions are prevented by allowing only one outstanding reference per register, or in the case of L registers, one outstanding reference per register group. The third, and final, part of the scalar tag is the "cancel" indicator, which prevents user programs from accessing data which is outside their allowed address space. This mechanism is described elsewhere in this document.

As shown in FIG. 6, the scalar load port 722 accepts returns destined for either the L registers 716 or the S registers 714. The L/S bit of the return tag determines which destination register type to write when the data returns from memory. When an S register is written, the request tag performs two functions. First, it causes the register to be unreserved, and this forms the write address for the S register file. When an L register is written, the tag performs the same two functions. However, the L registers are reserved and unreserved on a block basis rather than individual registers.

The request tag scheme outlined for scalar port returns allows L register loads to be interrupted by higher priority loads, such as S register loads. Since no ordering is imposed on the outgoing addresses, and none is imposed on the incoming data stream, it is possible to treat one set of register loads (e.g., L registers) as background activity, and treat another set (S registers) as foreground, high priority activity. With proper software assistance, then, the L registers can be treated as a software-managed cache accessed by block loads and stores.

Referring again to FIGS. 6a and 6b, the instruction request tag will be described. The instruction and input/output port 720 provides a path from memory to the instruction cache 710 and input/output buffers 712. To ensure proper instruction sequencing, the instruction port, like the other ports, supplies a request tag along with the request and address. The instruction request tag indicates the buffer number and element number in the buffer for the instruction return as shown in FIG. 7c.

Like the vector port register number, the instruction port buffer number indicator is encoded in a single tag bit. This restricts the number of outstanding buffer requests to two, but simplifies the control and data path associated with instruction loads. Instruction tag conflicts are prevented by waiting for the oldest buffer fill to complete before allowing a new one to start. Multiple outstanding loads for the same buffer are prohibited by the cache replacement policy. An encoding of the tag indicates whether the return destination is the instruction cache buffers 712 or the input/output return buffers 710.

Each vector load port 724, 726, 728 and 730 maintains two sets of "back" bits, one for each possible outstanding vector register for that port. As a return comes back from memory, the back bit for that register and element number is set equal to 1 and the data is written into the vector register. However, the control mechanisms 732 prevents the data from being used until all elements up to and including the previous element have been returned from memory. This ensures that all elements of a vector register are used in order even though the returns may come back out of order.

When all elements of a vector register have been returned from memory, the back bits for that side are marked "not back", and that set of back bits is made available for another load instruction. Vector and scalar load data whose tag indicates that the request has been cancelled, is discarded and replaced by a non-signalling NaN (Not a Number). This is how the preferred embodiment of the present invention protects memory data from access by programs that do not enable operand mapping exceptions. When instruction data returns from memory, the processor 10 uses the return tag to decide where to put it. Instruction returns, unlike data returns, do not use the cancel feature because instruction mapping exceptions are always enabled when in mapped mode. To avoid hazards associated with a non-coherent memory system, the processors 10 and external interface ports 22 require that the arbitration node 44 provide information beyond the tags. This information relates to the sequencing of requests and when those requests are committed to be processed by a particular shared resource. In the preferred embodiment, the technique used to insure coherency is referred to as, the data mark mechanism. The data mark mechanism is disclosed in greater detail in the parent application.

EXTERNAL INTERFACE PORTS

In addition to requests issued by the processor 10, the present invention is also capable of servicing resource requests issued from peripheral devices issued through the external interface ports 22. Data fetched from main memory 14 or the global registers 16 by the external interface ports 22 can return in an order that is different than the order in which it was requested. To accomplish the non-sequential access of the present invention, both the concentrator interfaces and the secondary memory transfer controllers associated with the external interface ports 22 append a request tag to resource requests made through the external interface ports 22.

Referring now to FIG. 8, a detailed description of the external interface ports 22 of the preferred embodiment is provided. The external interface ports 22 accepts packets of command and data words from the main memory 14 via a memory port cable (not shown) that physically connects the cluster channel interface (CCI) 120. Command words are placed in the command buffer 350 and data is routed into the data FIFO 360. The presence of a command in the command buffer 350 causes control logic 370 in the external interface ports 22 to request access to memory through the arbitration node 44. Data from the word count, command, address, and mtag fields of the command word are loaded into the respective registers 382, 384, 386 and 388 in preparation for delivery to the arbitration node 44 when the request is acknowledged. A new request tag and address must be computed for every word request made.

For fetch requests, no data is sent but an address and request tag are sent for a number of requests equal to the contents of the command word count field. The request tags are computed starting with the lower six bits set to zero and incrementing the contents of that field until the proper number of tags have been sent. Similarly, addresses for requests are computed starting with the address presented in the command word and incrementing it as each request is acknowledged.

For store requests, the next word in the data FIFO 360 is presented along with the address, tag, and command information. The word count value is decremented after each request. No further requests are made when the word count value reaches zero. FIFOs 350 and 360 are used to hold commands and data to ensure that, wherever possible, a command and data are always available at the external interface ports 22 to keep the arbitration node 44 constantly busy.

Fetched data returns from the shared resources through the transmit register 390. The request tag issued when the request was made is returned with the data. The output of the transmit register 390 is connected to the main memory 14. Control lines associated with the data lines in the cable linking the external interface ports 22 are inserted to indicate that a valid data word is on the bus for the CCI 120. Reference is made to the previously identified co-pending application entitled DISTRIBUTED INPUT/OUTPUT ARCHITECTURE FOR A MULTIPROCESSOR SYSTEM for a complete description of the functionality of the IOC 24.

Input/output request tags are sent with the command word that precedes the data packet when it travels through the IOC 24. The tags contain a four-bit field indicating which buffer in the IOC 24 will receive the data, and a 6-bit field indicating the location in that buffer where the data will be stored. The four-bit buffer select field is decoded as shown in FIG. 9. The code 101 directs data to one of the two SMTC command buffers. The other 6 tag bits indicate which buffer and in what location the returning data word is to be stored. The code 1111 is not used by the IOC 24. It is reserved for the processor instruction cache fetch operations. The IOC 24 shares a memory port with the instruction cache.

The 6 bit field is generated at the external interface ports for each individual data word request when it is made. Requests are made in order starting with the lowest address. Referring to FIG. 7d, the input/output request tags, the 6-bit word identifier and the four bit destination identifier, are placed in the 10 bit tag field. This tag travels with the request through the memory system and is returned with each word of data to the IOC 24. The request tags are then used in the IOC 24 means to direct the data word to the appropriate buffer and location in that buffer.

Because tags are created in sequential order when requests are made, using tags to address locations in destination buffers ensures that data is always loaded into the buffer in proper sequence, even if data returns in any arbitrary order. Reading the data from the buffer in sequential order therefore guarantees that data is returned to the destination in proper order.

ARBITRATION NODE

Referring again to FIGS. 5a and 5b, as viewed from the perspective of the shared resource (in this case the paths 50 and 52), each incoming request is arbitrated for by a request arbitration network 303. A similar response arbitration network 306 arbitrates the returning data back to their respective processor ports 315, 316, or 317. For incoming requests, an input queue 301 holds up to sixteen requests that are waiting to be passed through the request arbitration network 303. For returning responses, a data queue 305 holds up to sixty-four responses waiting for the response arbitration network 306 to pass the returning data back into the destination port 315, 316, or 317. Each of the queues 301 and 305 are strategically sized to cover any control latency as data flows between requestors and shared resources. Also as data is returned from a memory section, its associated tag is retrieved from the tag queue 304, and re-attached, before data and tag are loaded into data queue 305. For returns via the NRCA path 52, data and its associated tag are already paired, the NRCA and MRCA means handle associating data and tags.

When the request arbitration network 303 determines that an incoming request is requesting available resources and has the highest priority and is destined for a memory section, the address and data components of that request are placed on the path 50 and routed to the proper memory section. When the request arbitration network 303 determines that an incoming request is requesting available resources and has the highest priority and is destined for the NRCA 46, the address, data, and tag components of that request are placed on the path 52 and routed to the proper shared resource. It should be noted that the arbitration network 303 is essentially controlling access to the interconnect wires 50 and 52. Subsequent arbitration networks further along in the request path control access to other shared resources. Data may be returned to the requesting ports 315, 316 and 317 in a different order than requested. The arbitration node 44 receives a set of tags with each load address and queues them for future reference. When data is returned from main memory, the tags are re-attached to the corresponding data word and both data and tags are passed back to the requesting port. The processor 10 uses these tags to place the data int he proper destination and ensure that it is used in the correct sequence.

MAIN MEMORY

Again referring to FIGS. 5a and 5b, for memory references, the switching logic 400 for each memory section includes a subsection catch queue 401 in each memory subsection collects all incoming requests to that particular memory subsection from a given arbitration node 44. Each arbitration node 44 has its own set of catch queues in each memory section 14. A bank request arbitration network 405 will arbitrate among its group of subsection catch queues 401 that have pending requests for that bank 403 on each cycle. Once the request is selected, the selected request is issued to the destination bank 403. If the request is a store, address and data are issued to the bank. If the request is a load, only the address is issued to the bank. If the request is a load&flag, the address and data are issued to the bank. For the load and the load&flag requests, the returning data from the bank 403, is held in a hold queue 406 before a return arbitration network 407 grants the outgoing responses from the memory section.

REMOTE CLUSTER ADAPTER

Referring now to FIG. 10, for the NRCA means 46, an input queue 610 or 630 collects incoming requests. The input queue 610 holds references destined for the external interface. Arbitration network 612 will arbitrate among its group of input queues 610 that having pending requests for the external resource on each cycle. Once the request is selected, the selected request is issued to the destination resource, with address, data, a new tag called the cluster tag that is made up the request tag and additional source information (See FIG. 7e) is placed on path 58. The input queue 630 holds references destined for the interrupt mechanism, global registers 633, or SETN registers 632. Arbitration network 634 will arbitrate among its group of input queues 630 that have pending requests for that resource 620, 632, or 633 on each cycle. Once the request is granted, it is issued to the destination resource. If data is to be returned to the arbitration node 44 from the global registers 633 or SETN registers 632, a high priority request is presented to the output arbitration network 615 which results in the output path being cleared back to the arbitration node.

Data and tags returning from the MRCA means 48 via port 58 are received into a queue 614. Data from the global registers 633 or SETN registers 632 are pre-arbitrated and immediately place on the return path 52 along with the associated tags. During each clock cycle the response arbitration network 615 arbitrates for the return data path for port 52 or 56. The appropriate data is selected from the data queue 614 or the global registers 633 or SETN registers 632 and returned to the appropriate port 52 or 56.

Figure 11A:
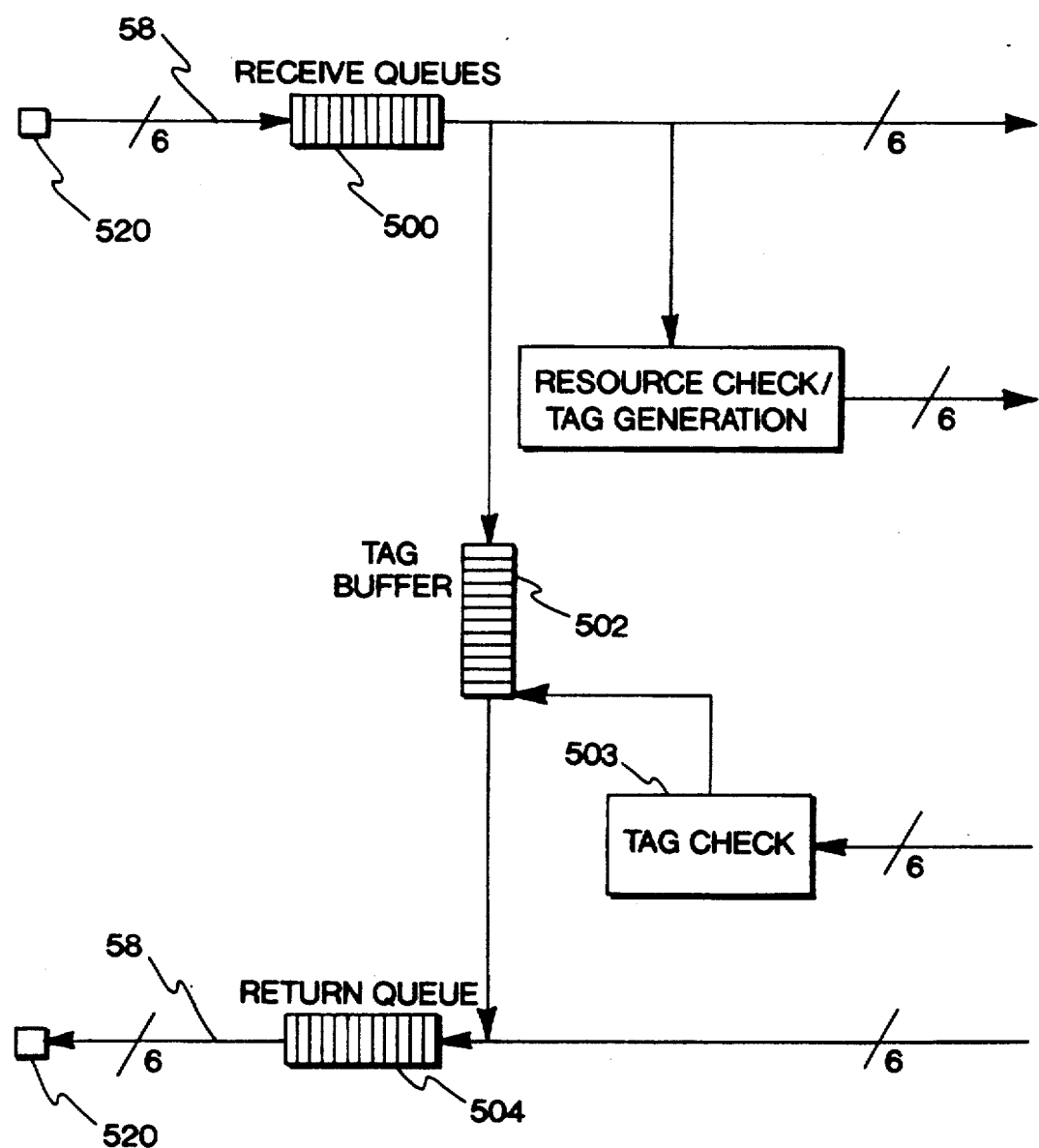
Figure 11B:
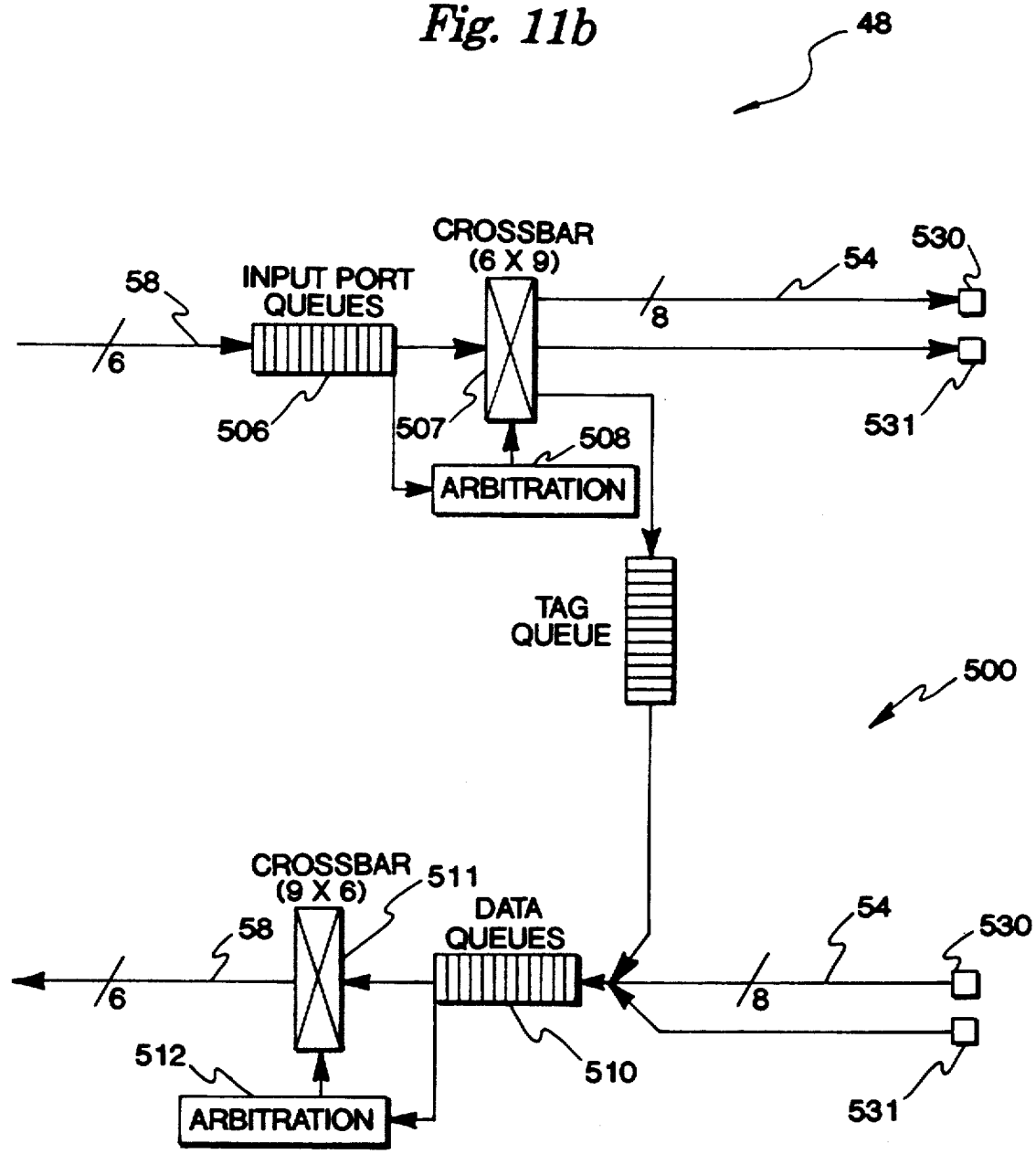

Referring now to FIGS. 11a and 11b, for the MRCA means 48, there are six ports 520 through which store and load operations from other clusters are received. Each of these ports consist of a receiving queue 500, a tag buffer 502, a return queue 504, and port control logic 501 and 503. Each port operates independently of all of the other ports. All operations that arrive at a port from another cluster are returned to that cluster. This includes stores as well as loads. The queues and arbitration for the MRCA means 48 (506, 507, 508, 509, 510, 511, and 512) essentially operate in a similar manner as the queues and arbitration for arbitration node 44 (301, 302, 303, 304, 305, 306, and 307, respectively).

When an operation arrives at an MRCA port 520 from an outside cluster, the data, address, and tag information are written into a receive queue 500 which is 64 locations deep. After a valid operation has been written into the receiving queue 500, port control logic 501 performs a resource check to determine if the operation can be passed into the MRCA means 48. There are three resources that are checked. The first resource that is checked concerns the availability of tags. As operations are passed into the MRCA means 48, the original cluster tag that arrived with the request is written into a tag buffer 502 and a new 8 bit request tag is generated by tag generator 501. The address of the location in the tag buffer 502 to which the original tag is written becomes the new request tag. This request tag must be unique, therefore once a new cluster tag has been generated and passed into the MRCA means 48 it can not be reused until that operation has returned back to the port from the MRCA means 48. The implementation of this logic requires that the request tags be generated in order. If the next request tag to be generated is still outstanding in the MRCA means 48 node means, the port can not issue its next operation from the receive queue 500. The tag buffer 502 is 256 locations deep.

The second resource that must be checked before an operation can be issued to the MRCA means 48 concerns the availability of locations in the return queue 504. The MRCA means 48 has no mechanism to force the arbitration node to hold a returning operation, therefore the MRCA means 48 must guarantee that there is always a location in the return queue 504 to store any operation that returns from the arbitration node 44. This return queue 504 is 128 locations deep. Once all of the locations in the return queue 504 have been allocated, no other operations can be issued to the MRCA means 48 until locations become available. The port queue 506 inside the MRCA means 48 is the third resource that must be checked before an operation can be issued from the receive queue 500. The port control logic 501 keeps a running total of the number of operations currently in the port queue 506. If the port queue 506 becomes full, the port control logic 501 must hold issue until locations become available.

When an operation returns from the MRCA means 48, the data, if any, is stored directly into the return queue 504. The request tag that is returned along with the operation is used to access the tag buffer and recover the original cluster tag 503. This original cluster tag is extracted from the tag buffer 502 and stored into the return queue 504 with the data. The port control logic 501 then does a resource check on the cluster at the far end of the inter-cluster path 520. If the far-end cluster has available locations in its receive queue, the return queue 504 is unloaded. Otherwise data is held until queue locations become available.

Although the description of the preferred embodiment has been presented, it is contemplated that various changes could be made without deviating from the spirit of the present invention. Accordingly, it is intended that the scope of the present invention be dictated by the appended claims, rather than by the description of the preferred embodiment.

We claim:

1. An apparatus for non-sequential shared resource access in a multiprocessor system having a plurality of processors coupled to a plurality of hardware shared resources, the apparatus comprising:
   a unique request generation means physically connected to each of the processors for generating a plurality of resource requests from that processors each of the resources requests comprising:
      an address for a requested shared resource; and
      a request tag designating a memory element means physically located within the processor for storing the resource request that is to be returned;
   a separate switching means physically connected to all of the request generation means for receiving the resource requests in a time order in which the resource requests were generated and routing the resource requests to the requested shared resources, the switching means including:
      tag queue means for storing the request tags associated with the resource requests; and
      logic means for associating the respective request tag from the tag queue means with a resource response; and
      means for returning the resource response and respective request tag to the processor; and
   a plurality of hardware shared resource means physically connected to the switching means for servicing the resource requests as the requested shared resource means becomes available and returning the resource response to the switching means in an order in which the resource requests are serviced,
   whereby the resource responses may be returned out-of-order as compared with the time order in which the resource requests were issued.

2. The apparatus of claim 1 wherein the logic means for associating the respective request tag further comprises cancel logic means for receiving a cancel indication from the request generation means and for canceling resource request prior to the time that the resource request is routed to the requested shared resonance in response to the cancel indication.

3. The apparatus of claim 2 wherein the cancel logic means indicates that a resource request has been canceled by returning a not-a-number value to the memory element means in the processor designated by the request tag in response to the resource request.

4. The apparatus of claim 1 wherein the request generation means comprises:
   execution means for executing a sequence of instructions, some of which make requests to the shared resource;
   means responsive to the execution means for generating the resource requests.

5. The apparatus of claim 1 wherein the switching means further includes arbitration node means for arbitrating among the resource requests that will be routed to the requested shared resources on a given clock cycle of the multiprocessor system.

6. The apparatus of claim 1 wherein the switching means further includes address verification means for verifying the validity of the address of the resource requests.

7. A method for accessing shared resources in a multiprocessor system having a plurality of processors coupled to a plurality of hardware shared resources, the method comprising the steps of:
   generating in unique hardware for each processor a plurality of resource requests from that processor, each of the resource requests comprising:
      an address for a requested shared resource; and
      a request tag designating a memory element physically located within the processor where the resource request is to be returned;
   presenting all of the resource requests to a switching mechanism separate from and physically connected to all of the processors and to the hardware shared resources in a time order in which the resource requests were issued;
   storing the request tags associated with the resource requests in a tag queue in the switching mechanism;
   sending the resource requests to the requested one of a plurality of hardware shared resources that will service the resource requests as the requested shared resources become available to produce a resource response and return the resource response to the switching mechanism in an order in which the resource requests are serviced;
   associating the respective tag from the tag queue with the resource response; and
   returning the resource response and respective tag to the processor,
   whereby the resource responses may be returned out-of-order as compared with the time order in which the resource requests were issued.

8. The method of claim 7 wherein the switching mechanism further performs the step of arbitrating among the resource requests that will be routed to the shared resource on a given clock cycle of the multiprocessor system.

9. The method of claim 7 wherein the switching mechanism further performs the step of verifying the validity of the address of the resource requests.

10. The method of claim 7 wherein the switching mechanism further performs the step of checking for a cancel indication associated with resource request and canceling the resource request prior to the time that the resource request is routed to the requested shared resource in response to the cancel indication by returning a flag value to the memory element designated by the request tag in response to the resource request.

11. An apparatus for non-sequential shared resource access in a multiprocessor system having a plurality of hardware requestors coupled to at a plurality of hardware shared resources, the apparatus comprising:
   a unique request generation means physically connected to each hardware requestor for generating a plurality of resource requests from that hardware requestor, each of the resource requests comprising:
      an address for a requested shared resource; and
      a request tag designating a memory means physically located within the processor for storing the resource request that is to be returned;
   a separate switching means physically connected to all of the request generation means for receiving the resource requests in a time order in which the resource requests were generated and routing the resource requests to the requested hardware shared resources, the switching means including:
      tag queue means for storing the request tags associated with the resource requests; and
      logic means for associating the respective request tag from the tag queue means with a resource response; and means for returning the resource response and respective request tag to the hardware requestor; and a plurality of hardware shared resource means physically connected to the switching means for servicing the resource requests as the requested hardware shared resources become available and returning the resource response to the switching means in an order in which the resource requests are serviced that is not required to be the same as the time order in which the resource requests were issued.

12. The apparatus of claim 11 wherein the switching means further includes arbitration node means for arbitrating among the resource requests that will be routed to the requested hardware shared resources on a given clock cycle of the multiprocessor system and address verification means for verifying the validity of the addresses of the resource requests.

13. The apparatus of claim 11 wherein the logic means for associating the respective request tag further includes cancel logic means for receiving a cancel indication from the request generation means for a resource request and for canceling the resource request prior to the time that the resource request is routed to the requested hardware shared resource in response to the cancel indication.

14. The apparatus of claim 11 wherein the hardware requestors and the hardware shared resources are physically organized into a plurality of clusters, each cluster physically comprising a unique one or more of the hardware requestors and a unique one or more of the hardware shared resources, and the switching means further comprises remote cluster adapter means associated with each cluster for receiving resource requests from the hardware requestors in the cluster which are directed to the hardware shared resources in a remote cluster and transmitting those requests to a remote cluster adapter means in the remote cluster and receiving resource responses from the remote cluster, and for receiving resource requests from remote cluster adapter means in the remote clusters which are directed to the hardware shared resources in the cluster and for returning the resource responses to the remote cluster.

15. A method for accessing shared resources in a multiprocessor system having a plurality of hardware requestors physically coupled to a plurality of hardware shared resources, the hardware requestors including both processors and external interface ports, the hardware shared resources including main memory, global registers and interrupt mechanisms, the method comprising the steps of:

generating in unique hardware for each hardware requestor a plurality of resource requests from that hardware requestor, each of the resource requests comprising:

an address for a requested shared resource; and a request tag designating a memory element physically located within the hardware requestor where the resource request is to be returned;

presenting the resource requests to a switching mechanism separate from and physically connected to both the requestors and the hardware shared resources in a time order in which the resource requests were issued;

storing the request tags associated with the resource requests in a tag queue in the switching mechanism;

sending the resource requests to the requested one of a plurality of hardware shared resources that will serve the resource requests as the requested hardware shared resources become available to produce a resource response and return the resource response to the switching mechanism in an order in which the resource requests are serviced that may be different than the time order in which the resource requests were issued;

associating the respective tag from the tag queue with the resource response; and returning the resource response and respective tag to the hardware requestor.

16. The method of claim 15 wherein the switching mechanism further performs the steps of:

arbitrating among the resource requests that will be routed to the requested hardware shared resources on a given clock cycle of the multiprocessor system; and verifying the validity of the addresses of the resource requests.

17. The method of claim 15 wherein the switching mechanism further performs the step of checking for a cancel indication associated with resource request and cancels the resource request prior to the time that the resource request is routed to the requested hardware shared resource in response to the cancel indication.

18. The method of claim 15 wherein the hardware requestors and hardware shared resources are physically organized into a plurality of clusters, each cluster physically comprising a unique one or more of the hardware requestors and a unique one or more of the hardware shared resources, and the switching mechanism performs the steps of:

receiving remote resource requests from the hardware requestors in the cluster which are directed to the hardware shared resources in a remote cluster; and transmitting the remote resource requests to a remote cluster and receiving the resource responses from the remote cluster.

19. The method of claim 18 wherein the switching mechanism further performs the steps of:

receiving remote resource requests from the remote clusters which are directed to the hardware shared resources in the cluster; and returning the resource responses to the remote cluster for the remote resource requests.

* * * * *

UNITED STATES PATENT AND TRADEMARK OFFICE
CERTIFICATE OF CORRECTION

PATENT NO. : 5,208,914

DATED : May 4, 1993

INVENTOR(S) : Jimmie R. Wilson et al.

It is certified that error appears in the above-indentified patent and that said Letters Patent is hereby corrected as shown below:

TITLE PAGE:

Under U.S. Patent Documents, please delete "Colley et al. 305/375" and insert --Colley et al. 395/375-- therefore.

Under Column 1, Line 40, please delete "sequences" and insert --sequenced-- therefore.

Under Column 9, Line 58, please delete "FIG. 6" and insert --FIGS. 6a and 6b-- therefore.

Under Column 13, Line 4, please delete "data int he" and insert --data in the-- therefore.

Under Column 15, Line 8, please delete "processors" and insert --processor-- therefore.

Under Column 15, Line 42, please delete "resonance" and insert --resource-- therefore.

Signed and Sealed this

Twentieth Day of February, 1996

Attest:

BRUCE LEHMAN

*Attesting Officer*     *Commissioner of Patents and Trademarks*